C. SMITH.
LEVER.
APPLICATION FILED AUG. 16, 1915.
1,192,695.
Patented July 25, 1916.
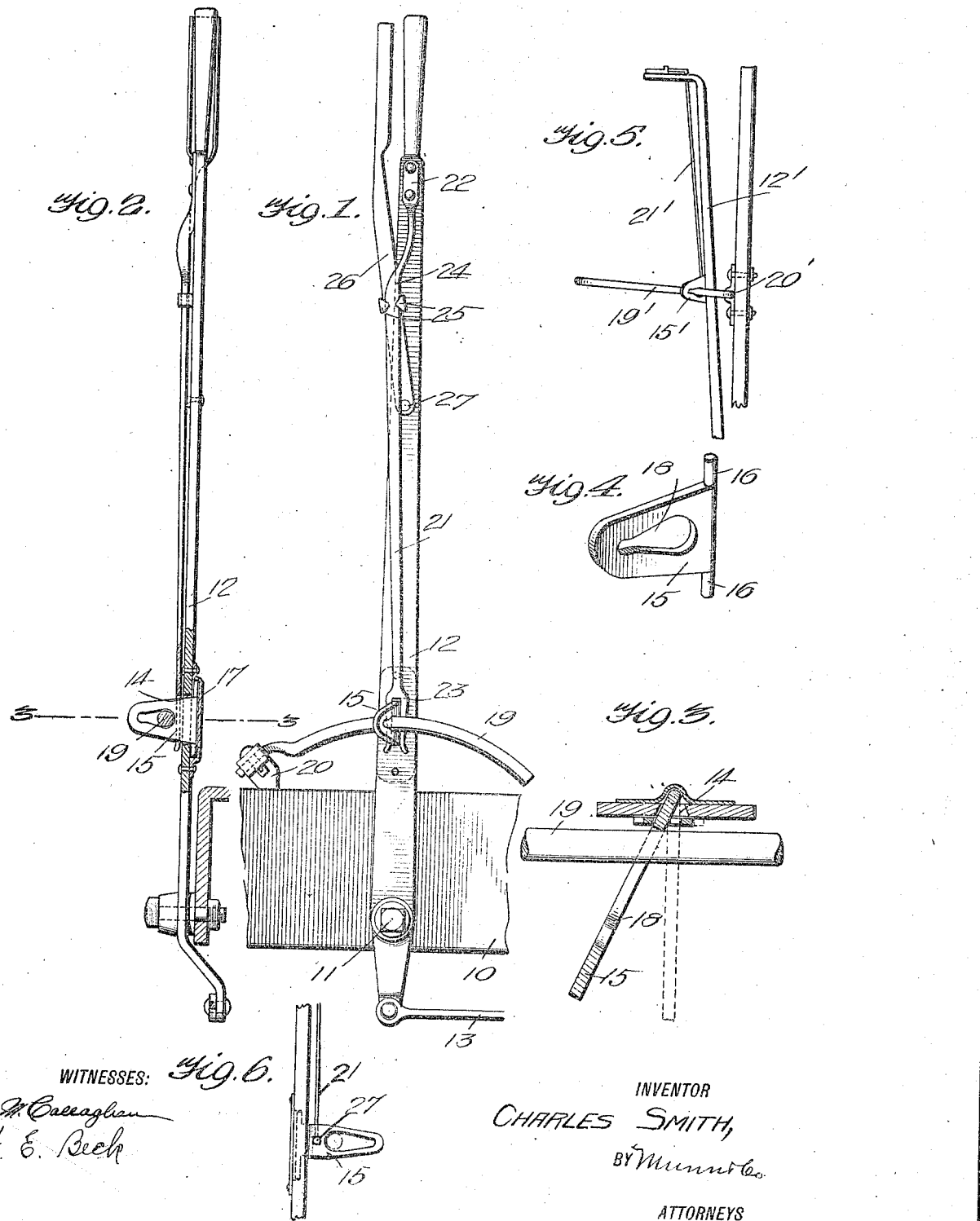
WITNESSES:
E. M. Callaghan
N. E. Beck
INVENTOR
CHARLES SMITH,
BY Munn & Co.
ATTORNEYS

UNITED STATES PATENT OFFICE.

CHARLES SMITH, OF HOUGHTON, MICHIGAN.

LEVER.

1,192,695.
Specification of Letters Patent.
Patented July 25, 1916.

Application filed August 16, 1915. Serial No. 45,703.

*To all whom it may concern:*

Be it known that I, CHARLES SMITH, a citizen of the United States, and a resident of Houghton, in the county of Houghton and State of Michigan, have invented an Improvement in Levers, of which the following is a specification.

This invention is an improvement in levers and has particular reference to an emergency brake lever employed on automobiles.

Heretofore, it has been a common practice to associate a toothed segment with a lever, the latter carrying a pawl adapted to engage one of the teeth of the segment to retain the lever in braking position.

The present invention is designed as an improvement upon the above construction and includes a novel locking device in the form of a clutch pivoted to the main portion of the lever and normally held in locking engagement with a pivoted bar by spring members secured to said main portion and adapted to be actuated to release said locking device.

Another object of the invention is the provision of a lever of this character which is simple in construction, easy to manufacture, durable, and effective in carrying out the purpose for which it is designed.

The inventive idea involved is capable of receiving a variety of mechanical expressions, some of which, for the purpose of illustrating the invention, are shown in the accompanying drawing, in which—

Figure 1 is a side elevation of a lever constructed in accordance with the invention. Fig. 2 is an edge elevation thereof partly broken away and shown in section. Fig. 3 is a transverse section on the line 3—3 of Fig. 2. Fig. 4 is a detail perspective view of the clutch member employed in connection with the invention. Fig. 5 is an elevation of a slightly modified form of the invention showing the lever employed as a foot operated device. Fig. 6 is an edge elevation of another slightly modified form.

Referring to the drawing and more particularly to Figs. 1 to 4 inclusive, the numeral 10 indicates a portion of the chassis of an automobile to which is pivoted at 11 the main portion 12 of the emergency brake lever, the lower end thereof being connected to the brake rod 13 in the usual manner. The lower end of the main portion 12 adjacent the pivot 11 is recessed as indicated at 14 to receive a clutch member 15 having preferably formed integral therewith the pivot pins 16 which engage in a housing 17 secured to one side of the main portion 12 as best illustrated in Fig. 2, thus pivotally connecting said clutch member to the main portion of the lever. This clutch member is formed from a flat piece of metal and is preferably tapered from its pivoted end to the free end thereof and is provided centrally with a similarly tapered substantially pear-shaped opening 18 through which a bar 19 is adapted to extend. This bar 19 is curved and pivoted at one end to a bracket 20 which is secured to the chassis 10 in such a manner as to permit of a slight lateral movement of the bar 19 relative to the main portion 12 for a purpose which will appear in the course of the description.

The clutch member 15 is adapted to normally engage the bar 19 so as to lock the lever in any adjusted position and in so engaging said bar the edges of the opening 18 in the clutch member will bind against said rod at three points of contact since said clutch member extends at an oblique angle to the main portion 12 when in locking position as shown in Figs. 1 and 3. The clutch member 15 is normally held in locking position by means of an elongated flat spring member 21 secured at one end 22 to the upper end of the main portion 12 and having at its lower end the bifurcation 23 which straddles said clutch member between the bar 19 and said main portion. The member 21 is twisted at 24 to give the same the proper resiliency and adjacent said twisted portion is engaged by means of lugs 25 carried by an auxiliary lever 26 pivoted at 27 to the main portion 12. The upper end of the lever 26 is arranged adjacent the handle of the portion 12 so that both may be easily grasped in order to actuate the spring member when it is desired to release the clutch member. By operating the lever 26 the lower end of the spring member 21 will be thrown to the right as shown in Fig. 1 when the clutch member 15 will be moved to the dotted line position shown in Fig. 3. This will disengage the edges of the opening 18 from the bar 19 and permit of the free swinging of the main portion 12 about its pivot 11 so as to actuate the brake rod 13 as desired. When the clutch member 15 swings about its pivot the inner end of the opening 18 which engages the bar 19 will have a tendency to force said bar outwardly and it is for this reason that said bar is pivoted at one end so as to move laterally relative to the main portion 12. When the main portion has been adjusted to proper braking position release of the lever 26 will cause the spring member to throw the clutch member to the full line position in Fig. 2 when the edges of the opening 18 will again bind against the bar 19 and effectively retain the brake in adjusted position.

In Fig. 5 there is shown a slight modification of the invention wherein there is employed a foot operated lever including the main portion 12' having a clutch member 15' pivoted thereto and constructed in the same manner as the clutch member in Fig. 4, but being adapted to engage the curved bar 19', pivoted at 20'. The clutch member 15' is similarly actuated by a spring member 21' which is operated when engaged by the foot of the operator.

In Fig. 6 there is shown a slight modification in the construction in which the spring member 21 is secured to the clutch member 15 at 27, instead of being provided with a bifurcation as in the embodiment shown in Fig. 1.

What is claimed is:

1. In combination, an arcuate bar pivoted at one end, a lever associated with said bar and including a main portion, a clutch member pivoted to said portion and adapted to normally lock the same in engagement with said bar, and a spring member secured at one end to said main portion and having its other end provided with a bifurcation adapted to straddle said clutch member for retaining the same in locking position.

2. In combination, a curved bar, a lever associated therewith, and a clutch member pivoted to said lever and normally extending at an oblique angle thereto, said clutch member being provided with a tapered opening adapted to receive said bar, the edges of the clutch member around said opening being adapted to engage said bar at three points of contact to retain the same in locking position.

3. In combination, a bar, a lever associated therewith, a pivoted clutch member having its axis of rotation parallel with said lever and provided with an opening adapted to receive said bar and bind against the same, and means engaging said clutch member for retaining the same in locking position.

4. In combination, a curved bar pivoted at one end, a lever associated therewith, a clutch member pivoted to said lever and extending laterally therefrom, said clutch member being provided with a tapered opening adapted to receive said bar, the edges of said clutch member around said opening normally binding against said bar to retain the lever in locking position, and means for shifting said clutch member whereby to move said bar about its pivot and release the clutch.

CHARLES SMITH.

Witnesses:
 Thos. S. Smith,
 Joseph Wimmer.